United States Patent [19]
Jackson et al.

[11] 3,931,028
[45] Jan. 6, 1976

[54] HEAT TRANSFER FLUID

[75] Inventors: Larry L. Jackson; Walter F. Seifert; Daniel E. Collins, all of Midland, Mich.

[73] Assignee: The Dow Chemical Company, Midland, Mich.

[22] Filed: Apr. 23, 1973

[21] Appl. No.: 353,851

Related U.S. Application Data

[63] Continuation-in-part of Ser. No. 139,882, May 3, 1971.

[52] U.S. Cl. .................................................. 252/73
[51] Int. Cl.² ........................................... C09K 5/00
[58] Field of Search ......... 252/73, 67, 68, 69, 52 R, 252/59

[56] References Cited
UNITED STATES PATENTS

| | | | |
|---|---|---|---|
| 1,882,809 | 10/1932 | Grebe | 252/73 |
| 1,972,847 | 9/1934 | Levine et al. | 252/73 |
| 2,172,391 | 9/1939 | Krase | 252/73 |

*Primary Examiner*—B. R. Padgett
*Assistant Examiner*—Deborah L. Kyle
*Attorney, Agent, or Firm*—A. R. Whale

[57] ABSTRACT

The well-known heat transfer fluid consisting essentially of the eutectic mixture of diphenyl oxide and biphenyl is improved by the addition thereto of monomethyl- or monoethylbiphenyl. The resulting fluids have very nearly the same boiling point and heat stability as the binary eutectic but have substantially lower freezing points.

7 Claims, No Drawings

HEAT TRANSFER FLUID

CROSS-REFERENCE TO RELATED APPLICATION

This application is a continuation-in-part of our co-pending application Ser. No. 139,882, filed May 3, 1971.

BACKGROUND OF THE INVENTION

The eutectic mixture of diphenyl oxide and biphenyl has been widely used as a high temperature heat transfer fluid for more than forty years (Grebe, U.S. Pat. No. 1,882,809). Among its more critical properties are its high boiling point, its thermal stability at and above the boiling point in both the liquid and the vapor phase, and the fact that the liquid and vapor phases have substantially the same composition. A primary drawback of this binary eutectic mixture is its relatively high freezing point (54°F.). This complicates its use in many outdoor applications.

In order to improve its utility, many additives have been proposed for the mixture. Among these are naphthalene, aniline, diphenylmethane and chlorodiphenyl (Rittler et al., U.S. Pat. No. 2,149,789). These have not been satisfactory, for one reason or another. Some raise the freezing point. Others are unstable at high temperatures or in the vapor phase. Still others have boiling points so different from that of the binary eutectic that the vapor composition differs widely from that of the liquid.

The alkylated diphenyls have been known for almost as long as the above binary eutectic and have been suggested for use as heat transfer fluids (Krase, U.S. Pat. No. 2,172,391) but have not been combined with the eutectic to improve their respective properties.

SUMMARY OF THE INVENTION

According to the present invention, a heat transfer fluid having substantially the desirable high temperature properties of the binary eutectic mixture of diphenyl oxide and biphenyl while having a substantially lower freezing point is obtained by adding methyl- or ethylbiphenyl to said eutectic mixture.

DETAILED DESCRIPTION OF THE INVENTION

The binary eutectic mixture of diphenyl oxide and biphenyl (DPO and BP respectively) is widely sold and extensively used under the trade name Dowtherm A fluid (hereinafter DTA). While this fluid contains the two components in the preferred proportions (73.6% DPO, 26.4% BP) for use in the present invention, it is not necessary to use precisely these proportions. Almost equally good results can be obtained with slightly different proportions (e.g., 70–80% BP) provided the proportion of methylbiphenyl (MBP) or ethylbiphenyl (EBP) is somewhat increased. Accordingly, these variations are to be understood as included wherever reference is made to DTA or the eutectic mixture. Also, MBP and EBP may be used separately or in combination as a mixture in any proportions for combining with DTA to produce the fluids of the invention. In fact, such mixtures are usually slightly more effective than either component alone in lowering the freezing point of DTA without substantially altering its high-temperature properties.

The proportion of MBP or EBP that should be incorporated into DTA depends primarily on the desired freezing point of the resulting fluid. For minimizing the differences other than freezing point between DTA and the new fluid, it is desirable to keep the proportion as low as possible while attaining the desired lowering of the freezing point. As little as 5–10% produces a significant lowering while less than 50% will ordinarily be sufficient to give an adequately low freezing point. The mixtures are made, of course, by merely blending together the components.

SPECIFIC EMBODIMENTS OF THE INVENTION

The following table shows the freezing points and boiling points of the components of the fluids of the invention and of several typical examples of formulated fluids. The MBP and EBP used therein were the unfractionated mixed isomers unless otherwise specified and consisted mostly of the meta and para isomers. Such mixtures are the equal of, or even superior to, the individual isomers; hence, it is usually preferred to use a mixture rather than a single isomer. When using such mixtures of isomers, it is preferred that the meta isomer constitute at least about 50% of the mixture and that the meta and para isomers together constitute at least about 90% of the isomer mixture. The MBP contained about 70% by volume of the meta isomer and about 23% of the para isomer, the balance being the ortho isomer, unsubstituted biphenyl and polymethylated biphenyl.

TABLE I

| Example No. | Fluid Composition, % by Vol. | | | | | Freezing Pt., °F. | Boiling Pt., °F. |
|---|---|---|---|---|---|---|---|
| | DPO | BP | DTA | MBP | EBP | | |
| | 100 | | | | | 77 | 495 |
| | | 100 | | | | 158 | 493 |
| | | | 100 | | | 54 | 495 |
| | | | | 100 | | −4 | 515 |
| | | | | | 100 | −44 | 536 |
| 1 | | | 67 | 33 | | 16 | 501 |
| 2 | | | 50 | 50 | | −29 | 505 |
| 3 | | | 33 | 67 | | −25 | 508 |
| 4 | | | 70 | | 30 | 10 | 506 |
| 5 | | | 50 | | 50 | <−58 | 512 |
| 6 | | | 30 | | 70 | −50 | 522 |

To show the effect of individual isomers of MBP as compared to a mixture thereof, the meta and para isomers were separated and used separately. The ortho isomer was not included because it is present in the crude mixture in only ver low proportions (<5%) and is therefore quite difficult to isolate in useful quantities. Its F.P. is 32°F.

TABLE II

| Ex. No. | Composition, % by Vol. | | | Freezing Pt., °F. |
|---|---|---|---|---|
| | DTA | p-MBP | m-MBP | |
| | 100 | | | 120 |

TABLE II-continued

| Ex. No. | Composition, % by Vol. | | | Freezing Pt., °F. |
|---|---|---|---|---|
| | DTA | p-MBP | m-MBP | |
| | | | 100 | 41 |
| 7 | 91 | 9 | | 41 |
| 8 | 82 | 18 | | 26 |
| 9 | 74 | 26 | | 21 |
| 10 | 68 | 32 | | 23 |
| 11 | 62 | 38 | | 23 |
| 12 | 91 | | 9 | 46 |
| 13 | 82 | | 18 | 35 |
| 14 | 70 | 30 | 19 | |
| 15 | 60 | | 40 | −3 |
| 16 | 50 | | 50 | −22 |

The fluids of the above examples have high-temperature properties substantially equivalent to those of DTA; hence, these fluids can be used in most applications as a direct replacement of DTA. Moreover, they are compatible with DTA and can be mixed therewith without harm.

We claim:

1. A heat transfer fluid consisting essentially of (a) diphenyl oxide, (b) biphenyl and (c) methylbiphenyl, ethylbiphenyl or mixture thereof, wherein (a) and (b) are present in essentially the proportions in their binary eutectic mixture and (c) is present in an amount sufficient to significantly lower the freezing point of the mixture of (a) and (b) said amount of (c) being at least about 5% by volume but not exceeding about 70% by volume.

2. The fluid of claim 1 wherein the component (c) constitutes about 5 to 50% of the total fluid.

3. The fluid of claim 1 wherein the component (c) constitutes about 10 to 40% of the total fluid.

4. The fluid of claim 1 wherein the ratio of components (a) and (b) is about 70:30 to 80:20 by volume.

5. The fluid of claim 1 wherein component (c) is a mixture of isomers of methylbiphenyl.

6. The fluid of claim 5 wherein component (c) contains at least about 50% of the meta isomer.

7. The fluid of claim 6 wherein component (c) contains at least about 90% of the combined meta and para isomers.

* * * * *